US012769533B2

(12) United States Patent
Suryanarayana

(10) Patent No.: US 12,769,533 B2
(45) Date of Patent: Oct. 20, 2026

(54) TIME-COORDINATED BOOT LOAD FIRMWARE FOR REAL-TIME PLATFORM PERFORMANCE TUNING

(71) Applicant: Dell Products L.P., Round Rock, TX (US)

(72) Inventor: Shekar Babu Suryanarayana, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 825 days.

(21) Appl. No.: 18/295,203

(22) Filed: Apr. 3, 2023

(65) Prior Publication Data

US 2024/0329967 A1 Oct. 3, 2024

(51) Int. Cl.
*G06F 8/65* (2018.01)
*G06F 9/4401* (2018.01)

(52) U.S. Cl.
CPC .............. *G06F 8/65* (2013.01); *G06F 9/4401* (2013.01)

(58) Field of Classification Search
CPC ................................. G06F 8/65; G06F 9/4401
See application file for complete search history.

(56) References Cited

U.S. PATENT DOCUMENTS

2023/0099455 A1* 3/2023 Nasim ................... G06F 9/4403 713/2
2023/0229453 A1* 7/2023 Chen ..................... G06F 9/4406 713/2

OTHER PUBLICATIONS

Ventre, Pier Luigi, et al. "On the fly orchestration of unikernels: Tuning and performance evaluation of virtual infrastructure managers." IEEE Transactions on Cloud Computing 9.2 (2018): 710-723. Retrieved from the Internet: < https://ieeexplore.ieee.org/stamp/stamp.jsp?tp=&arnumber=8540943> (Year: 2018).*

(Continued)

*Primary Examiner* — S. Sough
*Assistant Examiner* — Cheneca Smith
(74) *Attorney, Agent, or Firm* — Jackson Walker L.L.P.

(57) ABSTRACT

A disclosed method retrieves a first set of time coordinated computing (TCC) attributes from firmware objects of an existing boot image and a second group of TCC attributes from firmware objects of an update boot image, such as a BKC firmware update. A runtime TCC attributes map is generated based on the first and second TCC attributes. Device-specific, TCC firmware objects are created for one or more devices based on the runtime TCC attributes map, and attributes of the one or more devices are tuned at OS runtime based on the device-specific time coordinated firmware objects.

15 Claims, 3 Drawing Sheets

(56) References Cited

OTHER PUBLICATIONS

Gandhi, Anshul, et al. "Providing performance guarantees for cloud-deployed applications." IEEE transactions on cloud computing 8.1 (2017): 269-281.h Retrieved from the Internet <ttps://ieeexplore.ieee.org/abstract/document/8103799> (Year: 2017).*

Price et al. "Optimizing performance-per-watt on GPUs in high performance computing: Temperature, frequency and voltage effects." Computer Science-Research and Development 31.4 (2016): 185-193. Retrieved from the Internet: URL<https://link.springer.com/article/10.1007/s00450-015-0300-5> (Year: 2015).*

Ferreira et al. "Understanding the effects of DRAM correctable error logging at scale." 2021 IEEE International Conference on Cluster Computing (CLUSTER). IEEE, 2021. Retrieved from the Internet: URL<https://ieeexplore.ieee.org/stamp/stamp.jsp?tp=&arnumber=9556056> (Year: 2021).*

* cited by examiner

TIME-COORDINATED BOOT LOAD FIRMWARE FOR REAL-TIME PLATFORM PERFORMANCE TUNING

TECHNICAL FIELD

The present disclosure pertains to performance tuning of information handling systems and, more specifically, managing firmware updates for performance tuned information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An original equipment manufacturer (OEM) may produce information handling system platforms that are functionally suitable for a wide variety of use cases and workloads including, as illustrative examples, data analysis in the cloud, gaming PCs, traditional office laptops, network edge devices, and so forth. Each workload may have performance and power consumption characteristics and, historically, system designs emphasized higher performance at the expense of higher power consumption or vice versa. More recently, silicon vendors have implemented time coordinated computing (TCC) features for tuning specific hardware to augment compute performance to address stringent temporal requirements of real-time workloads. Real-time workloads include workloads that must consistently execute in compliance with predetermined timing constraints, typically in the microsecond to millisecond range, across numerous iterations. The use of TCC features is sometimes referred to as real-time tuning.

TCC enables systems that can tune to accommodate high performance workloads while maintaining an ability to run less demanding workloads in a power efficient manner. Examples of hardware components that may beneficially utilize real-time tuning include, without limitation, cache allocation technology (CAT), graphics technology class of service (GT COS), IOMMU, data direct input/output (I/O) write cache, and upstream virtual channels. However, TCC functionality, if not carefully management can negatively impact latency and other performance characteristics.

SUMMARY

Disclosed subject matter invokes a thin boot load firmware map to dynamically create a runtime TCC map for tuning TCC attributes for board support packages, I/O and processor fabric, peripheral hardware, and so forth. Following a best known configuration (BKC)-based firmware update, TCC attributes may be re-applied, without requiring an additional reboot, to system modules including, as examples, CAT, GT COS, an I/O memory management unit (IOMMU), data direct I/O write cache, upstream virtual channels, and other suitable resources.

In one aspect, disclosed systems and methods identify current values for TCC attributes of firmware objects associated with an existing boot image, retrieve updated values of the TCC attributes from an update boot image, and generate a runtime TCC attributes map based on the current and updated values of the TCC attributes. Device-specific, time coordinated firmware objects are created for one or more devices based on the runtime TCC attributes map and TCC attributes of the one or more devices are tuned based on the device-specific time coordinated firmware objects.

Tuning the TCC attributes may include tuning the TCC attributes at OS runtime as part of a firmware update without requiring an additional reboot. The TCC attributes may also be tuned in a one-time manner by an operating system service that accesses the runtime map by way of a real time OS. Identifying the current values for the TCC attributes includes performing a firmware management protocol (FMP) getImage service to obtain an FMP Image and invoking a getTCC-FMP method thereafter. Identifying the updated values for the TCC attributes may include performing a firmware management protocol (FMP) getImage service to obtain an FMP Image and invoking a getTCC-FMP method thereafter.

Disclosed subject matter advantageously achieves silicon-agnostic seamless BKC firmware updates without compromising on platform performance against TCC attributes. At OS runtime, dynamic tuning to time TCC attributes for various system software modules which have a hard dependency on hardware/firmware can be achieved without a platform reboot. In this manner, disclosed subject matter enables BKC-based firmware updates of deployed systems employing TCC enhancements to proceed seamlessly, including tuning the latest hardware/firmware capabilities. With a single reboot during the platform firmware update, the real TCC performance tuning is automatically applied.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
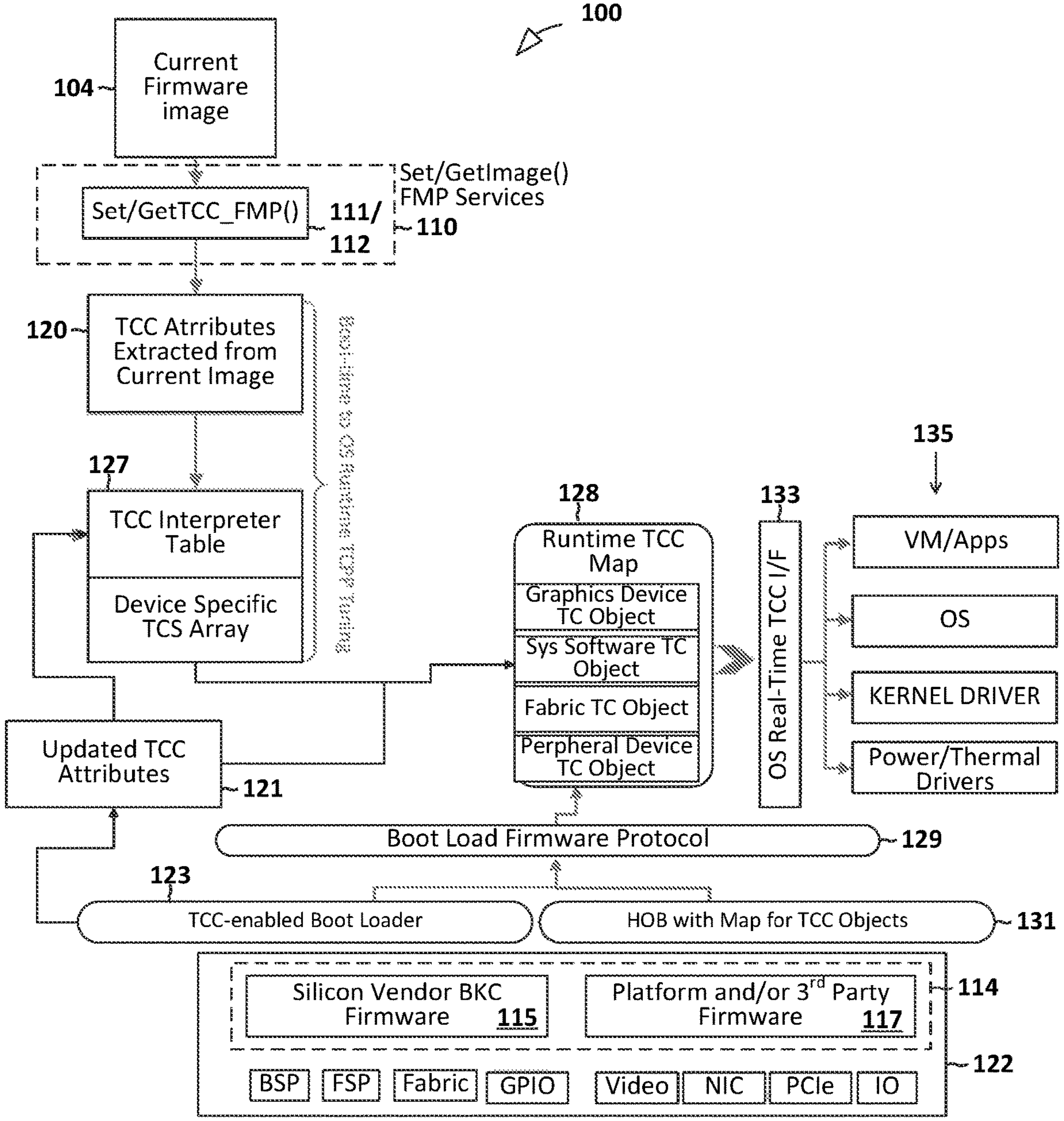
FIG. 1 illustrates exemplary TCC features of an information handling system in accordance with disclosed subject matter.

Exemplary embodiments and their advantages are best understood by reference to FIGS. 1-4, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit (CPU), microcontroller, or hardware or software control logic. Additional components of the information handling system may include one or more storage devices, one or more communications ports for communicating with external devices as well as various I/O devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIG. 1 illustrates TCC-aware features of a TCC-enabled information handling system 100 suitable for implementing a thin boot load firmware map to enable OS runtime tuning of a performance attributes against TCC objects. Get/SetTCC_FMP( ) methods 111/112 are defined from Get/SetImage firmware management protocol (FMP) Services 110. FMP Get/SetTCC_FMP( ) methods 111/112 may then be invoked to extract TCC attributes for each firmware object. As depicted in FIG. 1, Get/SetTCC_FMP( ) methods 111/112 extract TCC attributes 120 for the current firmware image 105. FIG. 1 further depicts a TCC-enabled boot loader 123 extracting updated TCC attributes 121 from TCC attribute updates 114, stored in a platform store 122, including TCC attribute updates 115 for a BKC maintained by a silicon vendor and TCC attribute updates 117 for any TCC attributes defined by the platform vendor and/or one or more third parties.

The TCC-enabled boot loader may be implemented with a Slim Boot Loader (SBL) from Intel or another suitable boot loader. Slim Bootloader (SBL) is an open-source boot firmware solution that initializes hardware components of the system when it is powered on. SBL is designed according to a modular approach and provides hardware initialization, then launches a payload to boot the OS.

Based on the current TCC attributes 120 and the update TCC attributes 121, a real-time TCC interpreter table 127 is generated to produce a runtime TCC firmware map 128 including a platform specific TCC firmware objects such as the depicted TCC firmware objects for a graphics device, system software, I/O and processor fabric, and one or more peripheral devices. The depicted examples of TCC firmware objects are exemplary and other implementations may employ more, fewer, and/or different TCC firmware objects.

As depicted in FIG. 1, a boot load firmware protocol 129 obtains, from a Pre-EFI initialization (PEI) handoff block (HOB) 131, mapping values for TCC objects to derive runtime TCC values for the platform's TCC firmware objects. An OS real-time interface 133 may be created to enable the OS and/or a virtual machine (VM) to update a node's TCC attributes. The derived TCC values can also be accessed by an OS real-time interface 133 by OS devices/system software 135 to perform tasks including, as examples, reducing worst case latency, providing platform quality of service, and implementing hardware time synchronization. TCC attribute values can be reapplied to system software modules including, as examples, graphics technology class of service (GT COS), I/O memory management unit (IOMMU), data direct I/O write cache, upstream virtual channels, without requiring an additional reboot.

TCC attributes may be used in conjunction with Real-Time register programming and configuration for use of L2 cache allocation technology (CAT) and pseudo-locking to prevent cache line replacement, enabling virtual channels for upstream peripheral components interface express (PCIe), and disabling power management in RT mode (P-states, C-power states, Speed Step, ASPM, Memory power savings, TSN object derivation (one-time).

Figure 2:
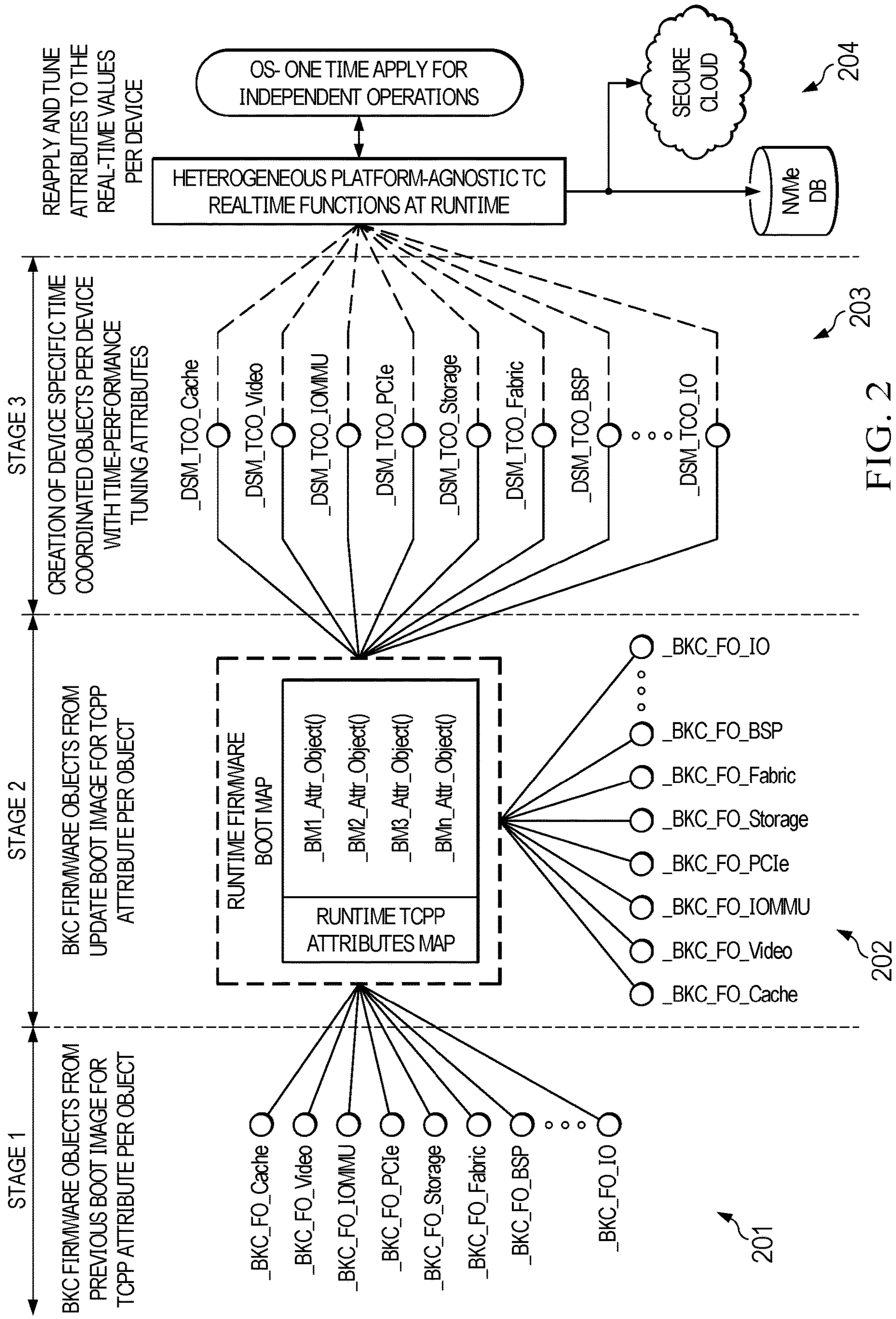
FIG. 2 illustrates details of an exemplary TCC-aware firmware update in accordance with disclosed subject matter.

FIG. 2 depicts exemplary stages for enabling TCC attributes to be re-applied for each applicable device at OS runtime. As depicted in FIG. 2 a first stage 201 includes accessing BKC firmware objects from a current boot image to obtain current TCC attributes for each applicable firmware object. A second stage 202 includes accessing BKC firmware objects from an update boot image to obtain update TCC attributes for each applicable object. A third stage 203 includes the creation of device specific TCC objects for each device featuring TCC attributes. A fourth stage 204 includes reapplying and tuning TCC attributes to real-time values per device.

Figure 3:
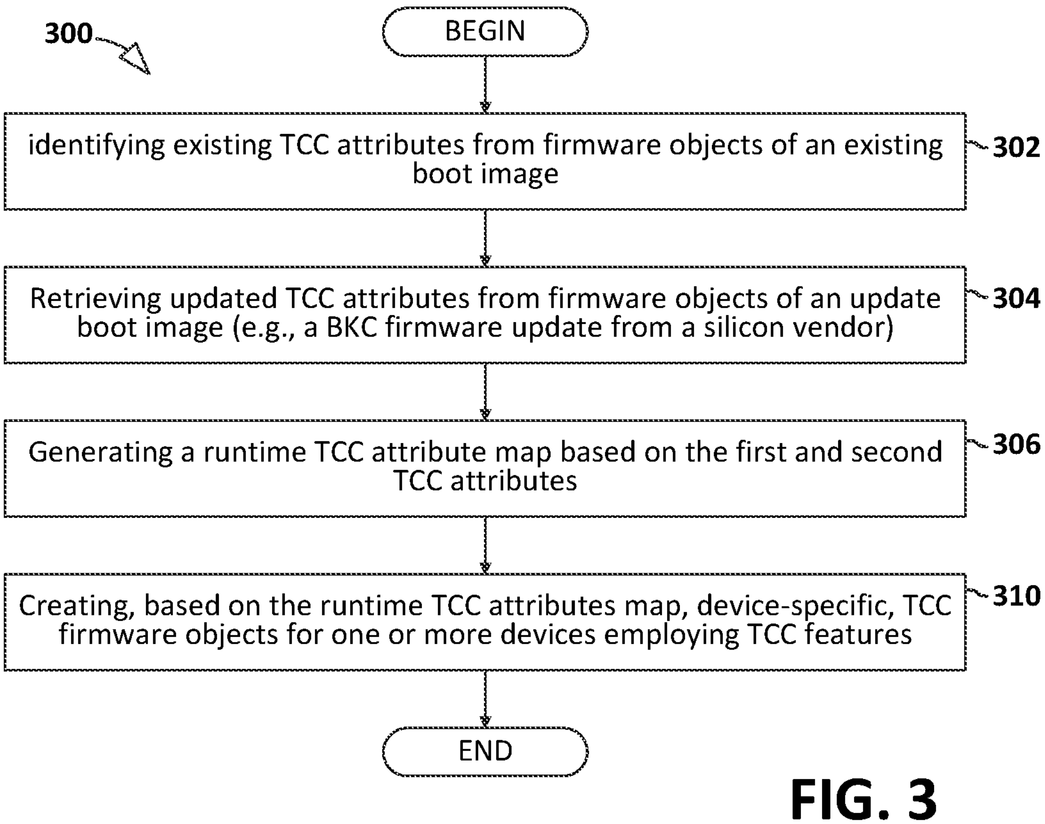
FIG. 3 illustrates a flow diagram of a TCC-aware firmware update method in accordance with disclosed subject matter.

FIG. 3 illustrates a flow diagram of an exemplary method 300 in accordance with disclosed teachings. As depicted in FIG. 3, method 300 includes identifying (operation 302) current TCC attributes of TCC firmware objects of an existing boot image and retrieving (operation 304) updated TCC attributes from firmware objects of an update boot image, which may correspond to a BKC firmware update from a silicon vendor. The illustrated method 300 further includes generating (operation 306) a runtime TCC attribute map based on the first and second TCC attributes and creating (operation 310) based on the runtime TCC attributes map, device-specific, TCC firmware objects for one or more devices employing TCC features. TCC attributes of the one or more devices may be tuned (operation 312) at OS runtime based on the device-specific time coordinated firmware objects.

Figure 4:
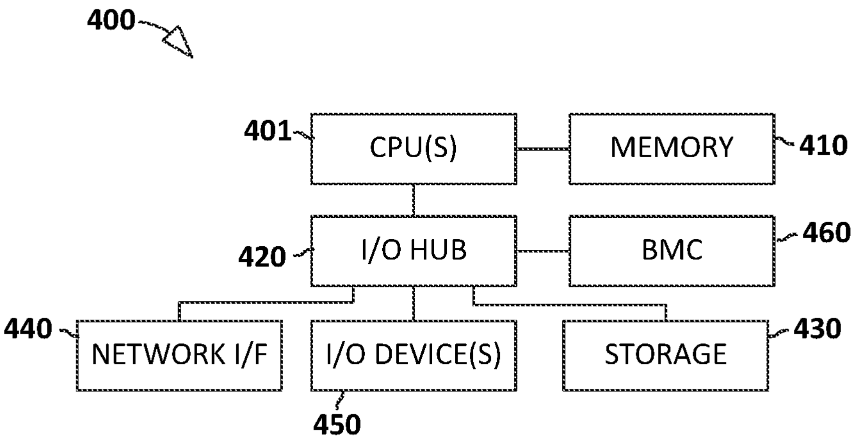
FIG. 4 illustrates an information handling system suitable for use in conjunction with the subject matter illustrated in FIGS. 1-3.

Referring now to FIG. 4, any one or more of the elements illustrated in FIG. 1 through FIG. 3 may be implemented as or within an information handling system exemplified by the information handling system 400 illustrated in FIG. 4. The illustrated information handling system includes one or more general purpose processors or CPUs 401 communicatively coupled to a memory resource 410 and to an input/output hub 420 to which various I/O resources and/or components are communicatively coupled. The I/O resources explicitly depicted in FIG. 4 include a network interface 440, commonly referred to as a NIC (network interface card), storage resources 430, and additional I/O devices, components, or resources 450 including as non-limiting examples, keyboards, mice, displays, printers, speakers, microphones, etc. The illustrated information handling system 400 includes a baseboard management controller (BMC) 460 providing, among other features and services, an out-of-band management resource which may be coupled to a management server (not depicted). In at least some embodiments, BMC 460 may manage information handling system 400 even when information handling system 400 is powered off or powered to a standby state. BMC 460 may include a processor, memory, an out-of-band network interface separate from and physically isolated from an in-band network interface of information handling system 400, and/or other embedded information handling resources. In certain embodiments, BMC 460 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method, comprising:
identifying current values for time-coordinated computing (TCC) attributes of firmware objects associated with an existing boot image;
retrieving updated values of the TCC attributes from an update boot image;
generating a runtime TCC attributes map based on the current and updated values of the TCC attributes;
creating device-specific, time coordinated firmware objects for one or more devices based on the runtime TCC attributes map; and
tuning TCC attributes of the one or more devices based on the device-specific time coordinated firmware objects.

2. The method of claim 1, wherein tuning the TCC attributes comprises tuning the TCC attributes at operating system runtime as part of a firmware update.

3. The method of claim 1, wherein tuning the TCC attributes comprises tuning the TCC attributes from within an operating system.

4. The method of claim 1, wherein identifying the current values for the TCC attributes includes performing a firmware management protocol (FMP) getImage service to obtain an FMP Image and invoking a getTCC-FMP method thereafter.

5. The method of claim 4, wherein retrieving the updated values for the TCC attributes includes performing a firmware management protocol (FMP) getImage service to obtain an FMP Image and invoking a getTCC-FMP method thereafter.

6. An information handling system, comprising:

a central processing unit (CPU); and a memory, accessible to the CPU, including processor-executable instructions that, when executed by the CPU, cause the system to perform operations comprising:

identifying current values for time-coordinated computing (TCC) attributes of firmware objects associated with an existing boot image;

retrieving updated values of the TCC attributes from an update boot image;

generating a runtime TCC attributes map based on the current and updated values of the TCC attributes;

creating device-specific, time coordinated firmware objects for one or more devices based on the runtime TCC attributes map; and tuning TCC attributes of the one or more devices based on the device-specific time coordinated firmware objects.

7. The information handling system of claim 6, wherein tuning the TCC attributes comprises tuning the TCC attributes at operating system runtime as part of a firmware update.

8. The information handling system of claim 6, wherein tuning the TCC attributes comprises tuning the TCC attributes from within an operating system.

9. The information handling system of claim 6, wherein identifying the current values for the TCC attributes includes performing a firmware management protocol (FMP) getImage service to obtain an FMP Image and invoking a getTCC-FMP method thereafter.

10. The information handling system of claim 9, wherein retrieving the updated values for the TCC attributes includes performing a firmware management protocol (FMP) getImage service to obtain an FMP Image and invoking a getTCC-FMP method thereafter.

11. A non-transitory computer readable medium having computer-executable instructions thereon that are executable by a processor of an information handling system to carry out operations comprising:

identifying current values for time-coordinated computing (TCC) attributes of firmware objects associated with an existing boot image;

retrieving updated values of the TCC attributes from an update boot image;

generating a runtime TCC attributes map based on the current and updated values of the TCC attributes;

creating device-specific, time coordinated firmware objects for one or more devices based on the runtime TCC attributes map; and tuning TCC attributes of the one or more devices based on the device-specific time coordinated firmware objects.

12. The non-transitory computer readable medium of claim 11, wherein tuning the TCC attributes comprises tuning the TCC attributes at operating system runtime as part of a firmware update.

13. The non-transitory computer readable medium of claim 11, wherein tuning the TCC attributes comprises tuning the TCC attributes from within an operating system.

14. The non-transitory computer readable medium of claim 11, wherein identifying the current values for the TCC attributes includes performing a firmware management protocol (FMP) getImage service to obtain an FMP Image and invoking a getTCC-FMP method thereafter.

15. The non-transitory computer readable medium of claim 14, wherein retrieving the updated values for the TCC attributes includes performing a firmware management protocol (FMP) getImage service to obtain an FMP Image and invoking a getTCC-FMP method thereafter.

* * * * *